W. J. STEWART.
VEHICLE HUB.
APPLICATION FILED FEB. 23, 1917.
1,270,069.
Patented June 18, 1918.
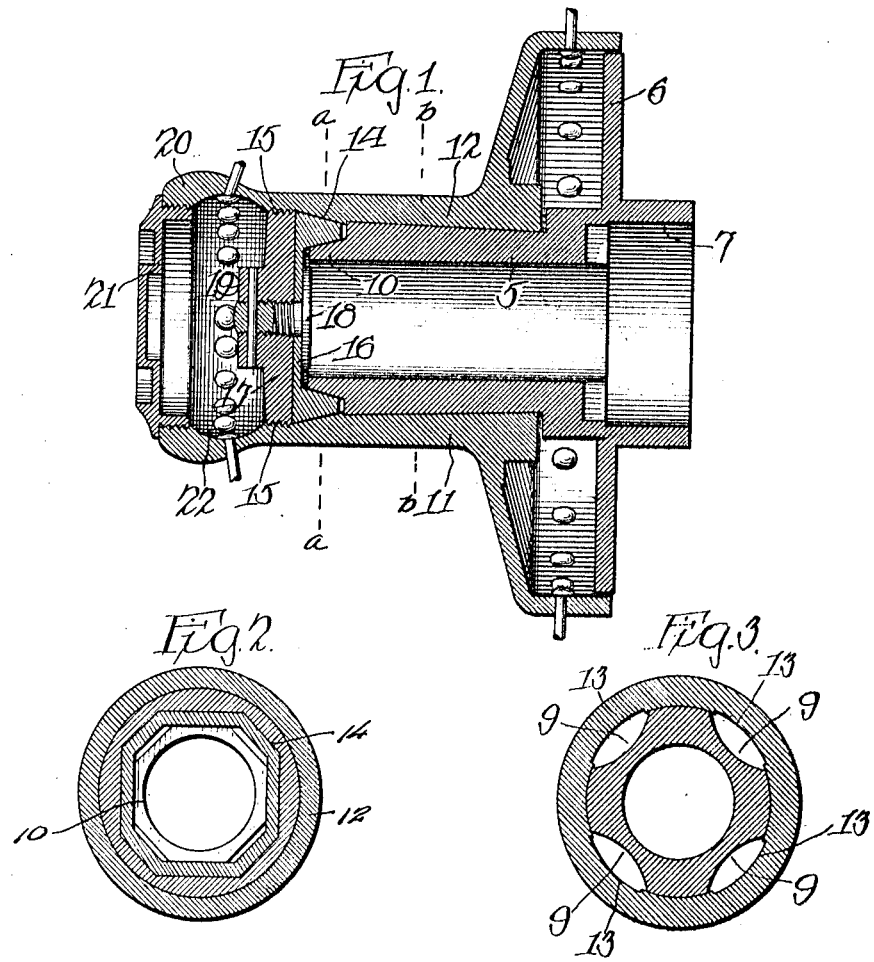
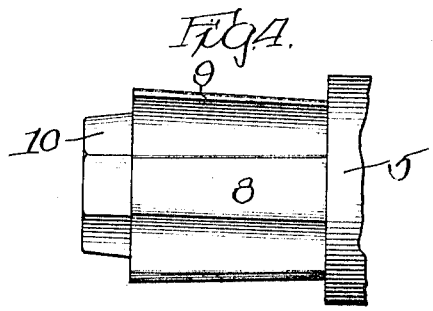
Inventor
William J. Stewart.
By Harry Lea Dodson.
Atty.

UNITED STATES PATENT OFFICE.

WILLIAM J. STEWART, OF CHICAGO, ILLINOIS.

VEHICLE-HUB.

1,270,069.

Specification of Letters Patent.

Patented June 18, 1918.

Application filed February 23, 1917. Serial No. 150,405.

*To all whom it may concern:*

Be it known that I, WILLIAM J. STEWART, a citizen of the United States, residing at Chicago, in the county of Cook and State of Illinois, have invented a certain new and useful Improvement in Vehicle-Hubs, of which the following is a specification.

My invention relates to that class of hubs, which are designed to be used in connection with wire wheels for automobiles.

Devices of this kind, with which I am familiar, are subject to the objection that it is difficult if not impossible, to provide any means for taking up the wear on the hub with the result that it will in a very short time, after put into use, wear and become very noisy and rattle continually.

Another objectionable feature is due to the fact that the hub is fastened on the permanent hub part by means of small lugs, and these, when they get wet, rust so that it becomes difficult, if not quite impossible, to remove the hub from the permanent hub part, when necessary.

Another very important objection is that the permanent hub part tapers outwardly, with the result that if the locking nut, which secures the hub to the permanent hub part, becomes loosened and falls away, the wheel will come off of the hub and cause an accident, besides the expense of making a repair to straighten the permanent hub part, if it is not broken.

My invention has for its object to provide a hub, which will provide means for taking up the wear, and in which the permanent hub part will taper inwardly, instead of outwardly, so as to hold the wheel on even when the aid of the locking device or nut is absent, and to provide means whereby it can be easily dislodged. Even if the water does get to the interior, it will not be able to rust sufficiently to cause any difficulty in the removal of the wheel.

My means of accomplishing the foregoing objects may be more readily understood by having reference to the accompanying drawings, which are hereunto annexed and are a part of this specification, in which:

Figure 1 is a longitudinal sectional view.

Fig. 2 is a section taken on the line *a—a* in Fig. 1.

Fig. 3 is a section taken on the line *b—b* in Fig. 1.

Fig. 4 is an enlarged fragmentary detail view of the permanent hub part.

Similar reference numerals refer to similar parts throughout the entire description.

As shown in the drawings, the permanent hub part 5, is provided with a flange 6, and a bearing plate 7.

The external walls of the permanent hub part, as clearly seen in Fig. 1, taper inwardly, and have clearance spaces 9, cut or formed on the sides of the external wall 8. The outer end of the permanent hub part, is provided with a reduced stem, or neck 10, formed in the shape of a polygon, the side walls of which taper outwardly. A cylindrical sleeve 11, forming the hub proper, is mounted upon the permanent hub part 5, the internal walls 12, of this sleeve tapering inwardly. These walls are fitted to and coincide with the taper of the permanent hub part 5, and they also have clearance spaces 13, cut or formed therein, and adjacent the end of the tapering portion is formed a frusto pyramid 14, the walls of which taper inwardly, at a greater angle than that of the taper on the sleeve. Internal threads 15, are cut on the inner wall of the sleeve 11, adjacent the outer edge of the polygon 14. A centering device 16, which also serves as a locking nut, is formed of a disk, having a peripheral flange formed in the shape of a frusto pyramid, the inner and outer sides of which are fitted to and coincide with the tapered polygons 10 and 14, on the permanent hub part, and sleeve respectively.

The locking nut 17, on the centering device is rotatably secured to it by means of a central screw 18, and is provided with an outwardly extending hexagonal nut 19. The cylindrical sleeve 11, extends out beyond the nut 19, and the end 20 thereof is provided with internal threads in which is fitted a dust cap 21. Although shown separate from the centering device 16, it may be found desirable in practice to make the dust cap a part of the centering device. The sides of the frusto pyramid formed on the flange of the centering device are unequal in size, as clearly shown in Fig. 2, so that it must be returned to its proper place to insure the concentricity of the wheel. The spokes 22, may be mounted in the ends of the cylindrical sleeve, the inner end of this sleeve fitting over the flange 6 which not only forms a brace for it, but also has the effect of closing the interior of the hub from the dust and dirt.

The assembly of the hub is accomplished in the following manner: It is apparent, inasmuch as the inner end of the tapered wall of the sleeve 11, is smaller than the outer end of the taper 8, on the permanent hub part, that it would be impossible to slide one over the other.

I accomplish this result by means of the clearing spaces 9 and 13. The sleeve is turned until the high points on the permanent hub part, fit into the clearances 13, when it is possible to drop the sleeve over the permanent hub part, when a quarter turn brings the two tapered portions in register with each other, and the centering device, 16, is then dropped into place, the nut 17 is rotated, serving to draw the permanent hub part up into the sleeve and at the same time to force the frusto pyramid formed on the flange of the centering device into position, holding the permanent hub part absolutely concentric. It is apparent that inasmuch as the contacts between the sleeve and the permanent hub part taper, the inner wear can be taken up by merely tightening this nut 17. At the same time, in the event that the nut should become loosened and drop off in use, it is apparent that the wheel cannot come off because of the fact that the outer end of the permanent hub part is larger than the inner end. When it is desired to remove the hub from the permanent hub part, the nut 17, is removed, carrying with it, the centering device, when a slight tap on the sleeve separates it from the permanent hub part. It can then be given a quarter turn when it can be drawn off with ease.

Having described my invention what I regard as new and desire to secure by Letters Patent is:

1. A vehicle hub comprising in combination with a permanent hub part, the outer wall of which tapers inwardly, the said outer wall having clearance spaces therein, of a sleeve inclosing the permanent hub part having its inner wall tapering inwardly, and clearance spaces formed therein, and means for connecting the said parts so as to comprise a complete hub.

2. In a vehicle hub, a permanent hub part having an inwardly tapering outer wall, the said wall having clearance spaces formed longitudinally of the permanent hub part, a frusto pyramidal projection integral with the end of the permanent hub part tapering outwardly, a sleeve having an inwardly tapering inner wall, the said inner wall having clearance spaces therein, an outwardly tapering seat formed on the inner wall of the sleeve adjacent the end of the inwardly tapering wall, and means holding the described parts in position.

3. In a vehicle hub, a permanent hub part having an inwardly tapering outer wall, having clearance spaces therein, an outwardly tapering frusto pyramidal projection on the end of the permanent hub part, a sleeve inclosing said part having an inwardly tapering inner wall having clearance spaces therein, an outwardly tapering seat on the inner wall of the sleeve adjacent the end of the inwardly tapering wall, screw threads on the inner wall of the sleeve in close proximity to the said seat, a disk, flanges thereon being polygonal in shape, fitting and coinciding with the space between the seat on the sleeve and the frusto pyramidal projection on the permanent hub part, and means engaging the said screw threads for locking the disk in position.

4. In a vehicle hub, a permanent hub part, a sleeve having its respective outer and inner walls tapering inwardly, clearance spaces in the said walls, an outwardly tapering frusto pyramidal projection on the end of the permanent hub part, a seat on the inner wall of the sleeve adjacent the end of the inwardly tapering portion tapering outwardly, internal screw threads on the sleeve in close proximity to the outwardly tapering seat, a disk, polygonal flanges thereon, fitting and coinciding with the space between the seat and frusto pyramidal projection, a locking nut, peripherally screw threaded and adapted to engage the internal threads on the sleeve bearing against said disk, and means comprising a screw connecting said disk and nut.

5. In a vehicle hub, a permanent hub part, a sleeve, an outwardly tapering seat on the inner wall thereof, a frusto pyramidal projection on the end of the permanent hub part tapering outwardly, a disk, flanges of polygonal shape thereon fitting and coinciding with the space between the said seat and frusto pyramidal projection internal threads carried by the sleeve adjacent the seat, a locking nut, peripheral screw threads engaging the internal threads, a screw connecting the nut and disk, means carried by the end of the sleeve for securing a dust cap thereto, and means for mounting spokes on the sleeve.

In testimony whereof I have signed the foregoing specification.

WILLIAM J. STEWART.